United States Patent
Miki (10) Patent No.: US 10,972,033 B2
(45) Date of Patent: Apr. 6, 2021

(54) MOTOR CONTROL DEVICE, ELECTRICALLY DRIVEN ACTUATOR PRODUCT, AND ELECTRICALLY DRIVEN POWER STEERING DEVICE

(71) Applicant: NSK LTD., Tokyo (JP)

(72) Inventor: Yasutoshi Miki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/638,269

(22) PCT Filed: Jul. 12, 2019

(86) PCT No.: PCT/JP2019/027711
§ 371 (c)(1),
(2) Date: Feb. 11, 2020

(87) PCT Pub. No.: WO2020/079899
PCT Pub. Date: Apr. 23, 2020

(65) Prior Publication Data
US 2020/0274473 A1 Aug. 27, 2020

(30) Foreign Application Priority Data

Oct. 19, 2018 (JP) .............................. JP2018-197267

(51) Int. Cl.
*H02P 21/06* (2016.01)
*H02P 21/22* (2016.01)
(Continued)

(52) U.S. Cl.
CPC ............ *H02P 21/22* (2016.02); *B62D 5/0463* (2013.01); *H02P 27/12* (2013.01)

(58) Field of Classification Search
CPC .......... H02P 21/22; H02P 27/12; H02P 21/06; B62D 5/0463
See application file for complete search history.

(56) References Cited

U.S. PATENT DOCUMENTS

| | | | | |
|---|---|---|---|---|
| 2009/0079375 A1* | 3/2009 | Suzuki | ..................... | H02P 21/22 318/434 |
| 2013/0009574 A1* | 1/2013 | Yoo | ......................... | H02P 21/06 318/400.02 |
| 2016/0079900 A1* | 3/2016 | Ogi | .......................... | H02P 21/22 318/400.02 |

FOREIGN PATENT DOCUMENTS

| | | |
|---|---|---|
| EP | 2262097 A1 | 12/2010 |
| EP | 3290296 A1 | 3/2018 |

(Continued)

OTHER PUBLICATIONS

Written Opinion dated Sep. 10, 2019 issued by the International Searching Authority in counterpart International Application No. PCT/JP2019/027711 (PCT/ISA/237).

(Continued)

*Primary Examiner* — Cortez M Cook
(74) *Attorney, Agent, or Firm* — Sughrue Mion, PLLC (57) ABSTRACT

A motor control device including: a power supply voltage detection unit configured to detect a power supply voltage; a rotational angular velocity detection unit configured to detect a rotational angular velocity of the motor; a command value calculation unit configured to calculate a q-axis and d-axis current command values; a gain computation unit configured to compute, based on an upper limit value of power supply current supplied from a power supply to the motor, the power supply voltage, the rotational angular velocity, the q-axis current command value, and the d-axis current command value, a limit gain reducing the power supply current to the upper limit value or lower by limiting the q-axis current command value and the d-axis current command value; and a driving circuit configured to drive the motor, based on the q-axis current command value and the d-axis current command value limited by the limit gain.

7 Claims, 5 Drawing Sheets

(51) Int. Cl.
*B62D 5/04* (2006.01)
*H02P 27/12* (2006.01)

(56) References Cited

FOREIGN PATENT DOCUMENTS

| | | |
|---|---|---|
| JP | 5109554 B2 | 12/2012 |
| JP | 201663559 A | 4/2016 |
| WO | 2007141634 A1 | 12/2007 |

OTHER PUBLICATIONS

Supplementary Search Report dated Oct. 21, 2020, from the European Patent Office in European Application No. 19845573.5.
Communication dated Nov. 2, 2020, from the European Patent Office in European Application No. 19845573.5.

\* cited by examiner

MOTOR CONTROL DEVICE, ELECTRICALLY DRIVEN ACTUATOR PRODUCT, AND ELECTRICALLY DRIVEN POWER STEERING DEVICE

This application is a National Stage of International Application No. PCT/JP2019/027711, filed Jul. 12, 2019, claiming priority based on Japanese Patent Application No. 2018-197267 filed on Oct. 19, 2018, the contents of all of which are incorporated herein by reference in their entirety.

TECHNICAL FIELD

The present invention relates to a motor control device configured to drive a motor by means of vector control, and an electrically driven actuator product and an electrically driven power steering device each of which includes a motor controlled by the motor control device.

BACKGROUND ART

An occurrence of excessive current supply (that is, overcurrent) to a motor causes a fault in wiring and switching elements constituting a power supply path between a power supply and the motor. For this reason, technologies for limiting power supply current supplied from a power supply to a motor to a predetermined limit value or lower have been proposed.

A motor control device described in PTL 1 described below computes, based on a relational expression among input power, output power, and loss power of a motor driving circuit, a q-axis current command value in such a way that power supply current becomes equal to or lower than an upper limit value.

CITATION LIST

Patent Literature

PTL 1: JP 5109554 B

SUMMARY OF INVENTION

Technical Problem

However, when the q-axis current is excessively limited, motor output torque is substantially reduced and motor performance and performance of an electrically driven actuator product using this motor are liable to be deteriorated. For example, in an electrically driven power steering that, using a motor, provides the steering system of a vehicle with steering assist force, reduction in motor output torque invites reduction in rotation following capability.

The present invention has been made in view of the problem as described above, and an object of the present invention is to lighten reduction in motor output torque occurring when power supply current supplied from a power supply to a motor is limited to a predetermined upper limit value or lower.

Solution to Problem

According to an aspect of the present invention, there is provided a motor control device configured to drive a motor by means of vector control, the motor control device including: a power supply voltage detection unit configured to detect a power supply voltage; a rotational angular velocity detection unit configured to detect a rotational angular velocity of the motor; a command value calculation unit configured to calculate a q-axis current command value and a d-axis current command value; a gain computation unit configured to compute, based on an upper limit value of power supply current supplied from a power supply to the motor, the power supply voltage, the rotational angular velocity, the q-axis current command value, and the d-axis current command value, a limit gain reducing the power supply current to the upper limit value or lower by limiting the q-axis current command value and the d-axis current command value; and a driving circuit configured to drive the motor, based on the q-axis current command value and the d-axis current command value limited by the limit gain.

According to another aspect of the present invention, there is provided an electrically driven actuator product including: a motor control device above; and a motor configured to be controlled by the motor control device.

According to still another aspect of the present invention, there is provided an electrically driven power steering device including: a motor control device above; and a motor configured to be controlled by the motor control device, the electrically driven power steering device providing a steering system of a vehicle with steering assist force, using the motor.

Advantageous Effects of Invention

According to the present invention, it is possible to lighten reduction in motor output torque occurring when power supply current supplied from a power supply to a motor is limited to a predetermined upper limit value or lower.

DESCRIPTION OF EMBODIMENTS

Embodiments of the present invention will be described in detail with reference to the drawings.

Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment

Configuration

Figure 1:
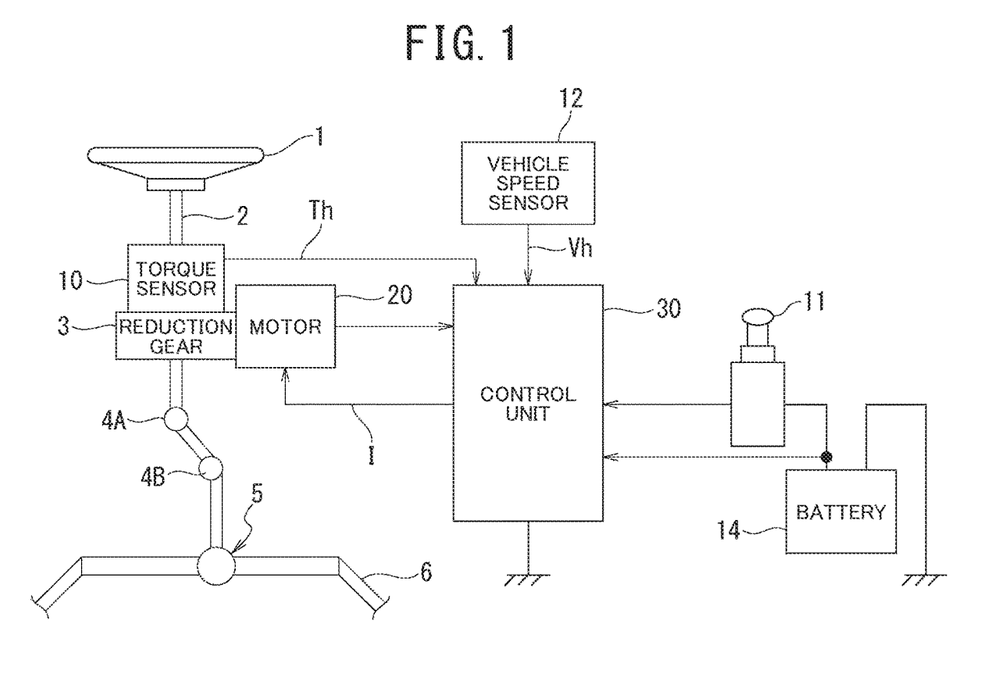
FIG. 1 is a configuration diagram illustrative of an outline of an example of an electrically driven power steering device of embodiments.

A configuration example of an electrically driven power steering device of an embodiment is illustrated in FIG. 1. A column shaft 2 of a steering wheel 1 is joined to a tie rod 6 connecting steered wheels via a reduction gear 3, universal joints 4A and 4B, and a rack-and-pinion mechanism 5. To the column shaft 2, a torque sensor 10 configured to detect steering torque applied to the steering wheel 1 is disposed, and a motor 20 configured to assist steering force of the steering wheel 1 is joined to the column shaft 2 via the reduction gear 3.

To a control unit (ECU) 30 configured to control the power steering device, power is supplied from a battery 14 that is a power supply and, in conjunction therewith, an ignition key signal is input from an ignition key 11, and the control unit 30 performs, based on steering torque Th detected by the torque sensor 10 and vehicle speed Vh detected by a vehicle speed sensor 12, calculation of a steering assist command value of an assist command, using an assist map or the like and controls, based on the calculated steering assist command value, current I to be supplied to the motor 20.

In the electrically driven power steering device having such a configuration as described above, steering torque Th that is generated by steering operation performed by a driver and transmitted from the steering wheel 1 is detected by the torque sensor 10, the motor 20 is drive-controlled by a steering assist command value computed based on the detected steering torque Th and vehicle speed Vh, this drive is provided to a steering system as assist force for steering operation performed by the driver (steering assist force), and the driver can thereby perform steering operation with light force. That is, how the motor 20 is controlled based on a steering assist command value that is computed from steering torque Th output by steering wheel operation and vehicle speed Vh determines whether or not the driver feels easy to perform the steering wheel operation and substantially affects performance of the electrically driven power steering device.

The control unit 30 may, for example, include a computer that includes a processor and peripheral components, such as a storage device. The processor may be, for example, a central processing unit (CPU) or a micro-processing unit (MPU).

The storage device may include any of a semiconductor storage device, a magnetic storage device, and an optical storage device. The storage device may include a register, a cache memory, and a memory, such as a read only memory (ROM) and a random access memory (RAM), that is used as a main storage device.

Note that the control unit 30 may be constituted by dedicated hardware for performing respective information processing, which will be describe below.

For example, the control unit 30 may include functional logic circuits that are implemented in a general-purpose semiconductor integrated circuit. For example, the control unit 30 may include a programmable logic device (PLD), such as a field-programmable gate array (FPGA), or the like.

Figure 2:
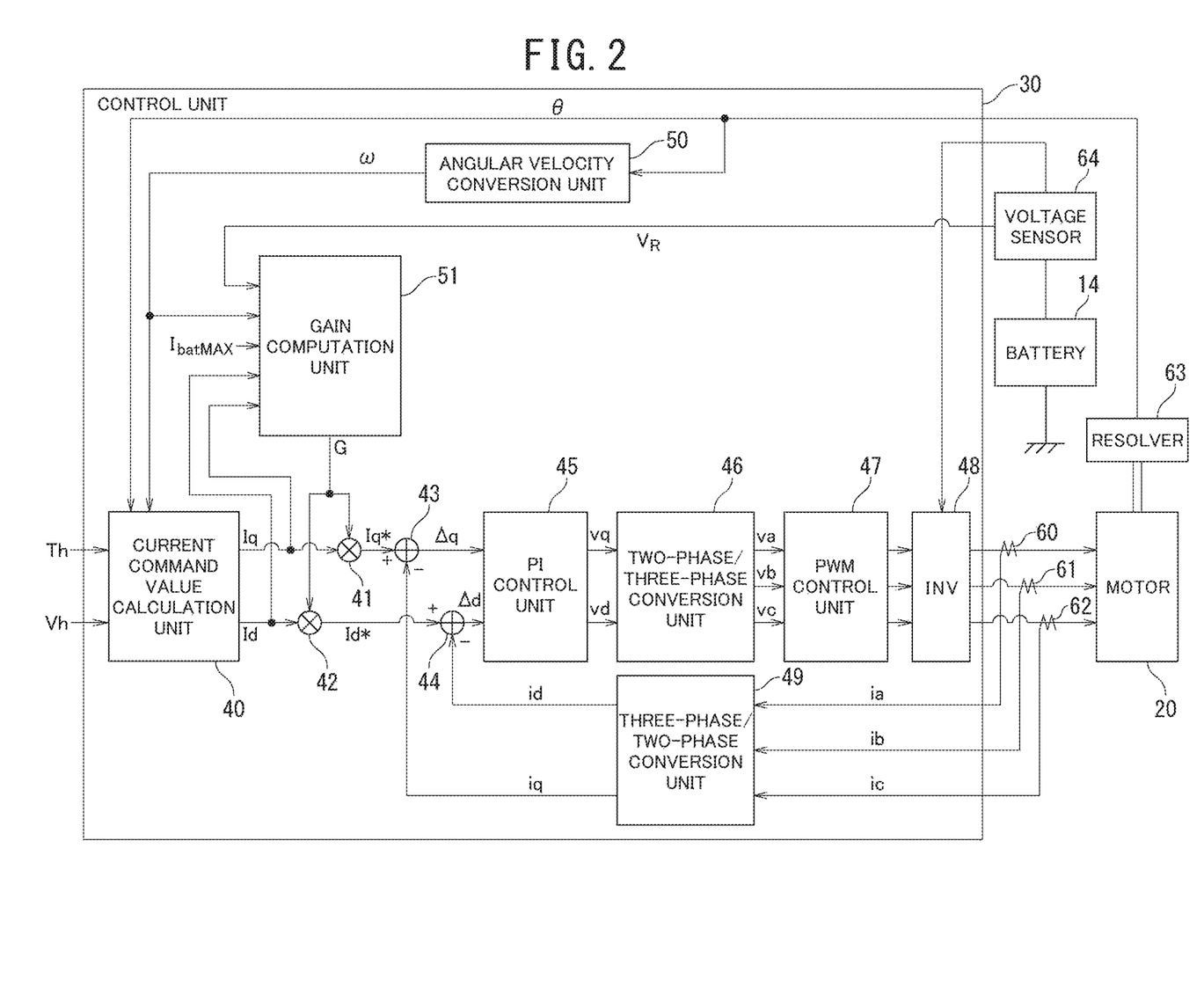
FIG. 2 is a block diagram illustrative of an example of a functional configuration of a control unit of a first embodiment.

With reference to FIG. 2, an example of a functional configuration of the control unit 30 of the first embodiment will be described. The control unit 30 includes a current command value calculation unit 40, multipliers 41 and 42, subtractors 43 and 44, a proportional-integral (PI) control unit 45, a two-phase/three-phase conversion unit 46, a PWM control unit 47, an inverter 48, a three-phase/two-phase conversion unit 49, an angular velocity conversion unit 50, and a gain computation unit 51 and drives the motor 20 by means of vector control. Note that an inverter is denoted by "INV" in the accompanying drawings.

Functions of the current command value calculation unit 40, the multipliers 41 and 42, the subtractors 43 and 44, the PI control unit 45, the two-phase/three-phase conversion unit 46, the PWM control unit 47, the inverter 48, the three-phase/two-phase conversion unit 49, the angular velocity conversion unit 50, and the gain computation unit 51 are implemented by, for example, the processor in the control unit 30 performing computer programs stored in the storage device.

The current command value calculation unit 40 calculates a q-axis current command value Iq and a d-axis current command value Id, based on steering torque Th and vehicle speed Vh. The multipliers 41 and 42 compute a limited q-axis current command value Iq* and a limited d-axis current command value Id* by multiplying the q-axis current command value Iq and the d-axis current command value Id by a limit gain G computed by the gain computation unit 51, respectively.

Meanwhile, motor currents ia, ib, and ic provided to the motor 20 are detected by current sensors 60, 61, and 62, respectively, and the detected motor currents ia, ib, and ic are converted to two-axis current composed of a d-axis current id and a q-axis current iq by the three-phase/two-phase conversion unit 49.

The subtractors 43 and 44 compute a q-axis deviation current $\Delta q$ and a d-axis deviation current $\Delta d$ by subtracting the fed-back currents iq and id from the limited q-axis current command value Iq* and the limited d-axis current command value Id*, respectively. The q-axis deviation current $\Delta q$ and the d-axis deviation current $\Delta d$ are input to the PI control unit 45.

The PI control unit 45 computes voltage command values vq and vd that reduce the q-axis deviation current $\Delta q$ and the d-axis deviation current $\Delta d$ to 0, respectively. The motor 20 is a three-phase motor, and the two-phase/three-phase conversion unit 46 converts the voltage command values vq and vd to three-phase voltage command values va, vb, and vc.

The PWM control unit 47 generates PWM-controlled gate signals, based on the three-phase voltage command values va, vb, and vc.

The inverter 48 is driven by the gate signals generated by the PWM control unit 47, and, to the motor 20, currents that reduce the q-axis deviation current $\Delta q$ and the d-axis deviation current $\Delta d$ to 0 are supplied.

The resolver 63 detects a motor angle (rotation angle) $\theta$ of the motor 20, and the angular velocity conversion unit 50 computes a rotational angular velocity $\omega$ of the motor 20, based on change in the motor angle $\theta$. These motor angle $\theta$ and rotational angular velocity $\omega$ are used in the vector control.

The gain computation unit 51 computes a limit gain G that reduces power supply current that is supplied from the battery 14 to the motor 20 via the inverter 48 to a predetermined upper limit value $I_{batMAX}$ or lower. Note that the upper limit value $I_{batMAX}$ is set by a vehicle-side controller performing power supply management by means of CAN transmission or is set inside the control unit 30. Applying a large current when the power supply voltage is reduced to lower than a normal voltage range sometimes causes an excessive power supply voltage reduction and a problem in the functioning of a motor control device. Therefore, aimed at preventing such a functioning problem in the motor control device due to an excessive voltage reduction as described above, and the like in addition to eliminating a cause of a fault in wiring and switching elements, the upper limit value $I_{batMAX}$ to be set is sometimes set at a value lower than an upper limit value that is set for normal battery voltage. Hereinafter, an example of a computation method of the limit gain G will be described.

For example, among input power, output power, and loss power of a motor and driving circuit, the equation (1) below holds.

[Math 1]

$$V_R \cdot I_{bat} = K_t \cdot Iq \cdot \omega + R^{3/2}(Id^2 + Iq^2) + \text{Ploss} \quad (1)$$

In the above equation, $V_R$ is power supply voltage that is inverter applied voltage applied to the inverter 48 by the battery 14, $I_{bat}$ is power supply current that is battery current flowing from the battery 14 to the motor 20 via the inverter 48, $K_t$ is a torque constant of the motor 20, Iq is q-axis current, Id is d-axis current, R is a resistance value per phase of the motor 20, and Ploss is loss power caused by iron loss, friction, and the like.

Substituting the upper limit value $I_{batMAX}$, the limited q-axis current command value Iq*(=G×Iq), and the limited d-axis current command value Id*(=G×Id) into the power supply current $I_{bat}$ and the currents Iq and Id in the equation (1), respectively, results in the equation (2) below.

[Math 2]

$$V_R \cdot I_{batMAX} = K_t \cdot G \cdot Iq \cdot \omega + R^{3/2} \cdot G^2(Id^2 + Iq^2) + \text{Ploss} \quad (2)$$

The equation (2) above is a relational equation that holds among input power based on the power supply voltage $V_R$ and the upper limit value $I_{batMAX}$, output power based on the rotational angular velocity ω and the q-axis current command value Iq* and the d-axis current command value Id* that are limited by the limit gain G, and loss power.

More specifically, the equation (2) above represents that input power based on the power supply voltage $V_R$ and the upper limit value $I_{batMAX}$ equals to the sum of output power based on the rotational angular velocity ω and the q-axis current command value Iq* and the d-axis current command value Id* that are limited by the limit gain G and loss power.

Solving the equation (2) above with respect to the limit gain G results in the correction gain computation equation (3) below.

[Math 3]

$$G = \frac{-K_t \cdot \omega \cdot Iq + \sqrt{(K_t \cdot \omega \cdot Iq)^2 + 6R(Id^2 + Iq^2)(V_R \cdot I_{batMAX} - P_{loss})}}{3R(Id^2 + Iq^2)} \quad (3)$$

The gain computation unit 51 computes a limit gain G, based on the upper limit value $I_{batMAX}$ for the power supply current, the power supply voltage $V_R$, the rotational angular velocity ω of the motor 20, the q-axis current command value Iq, and the d-axis current command value Id and the correction gain computation equation (3).

The power supply voltage $V_R$ is detected by a voltage sensor 64. As the loss power Ploss in the correction gain computation equation (3), a value predetermined through calculation or experiment may be used, and, for example, the loss power Ploss may be loss power at the time of unloaded rotation.

As described above, the q-axis current command value Iq and the d-axis current command value Id, which are calculated by the current command value calculation unit 40, are limited by being multiplied by the limit gain G by the multipliers 41 and 42, respectively, and, by driving the motor 20 with the limited q-axis current command value Iq* and the limited d-axis current command value Id*, the power supply current is reduced to the upper limit value $I_{batMAX}$ or lower.

When the power supply current is equal to or lower than the upper limit value $I_{batMAX}$, that is, it is not necessary to correct the current command values Iq and Id, the value of the limit gain G, which is computed using the correction gain computation equation (3), is 1 or greater. Therefore, when a result from computation using the correction gain computation equation (3) is 1 or greater, the gain computation unit 51 sets the value of the limit gain G at 1 and thereby disables limitation by the limit gain G.

Note that the battery 14 is an example of a power supply described in CLAIMS. The control unit 30 and the voltage sensor 64 are examples of a motor control device described in CLAIMS. The inverter 48 is an example of a driving circuit described in CLAIMS. The resolver 63 and the angular velocity conversion unit 50 are examples of a rotational angular velocity detection unit described in CLAIMS.

Action of Embodiment

Figure 3A:
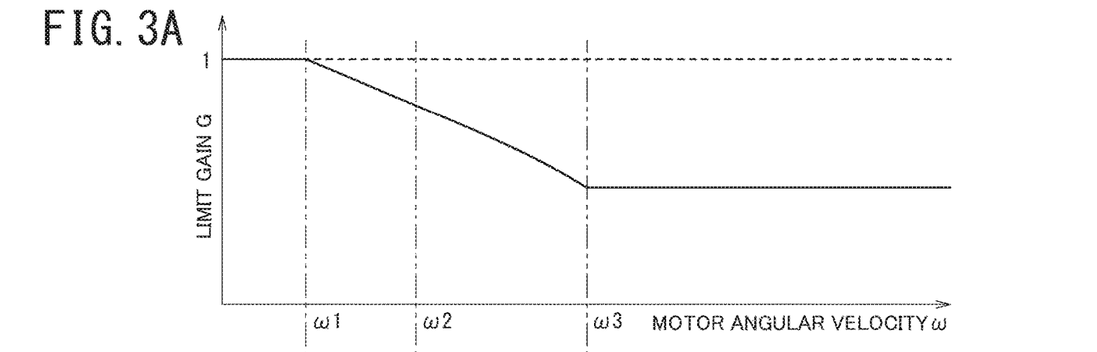
FIG. 3A is a graph broadly illustrative of a relationship between, limit gain G and motor angular velocity $\omega$.
Figure 3B:
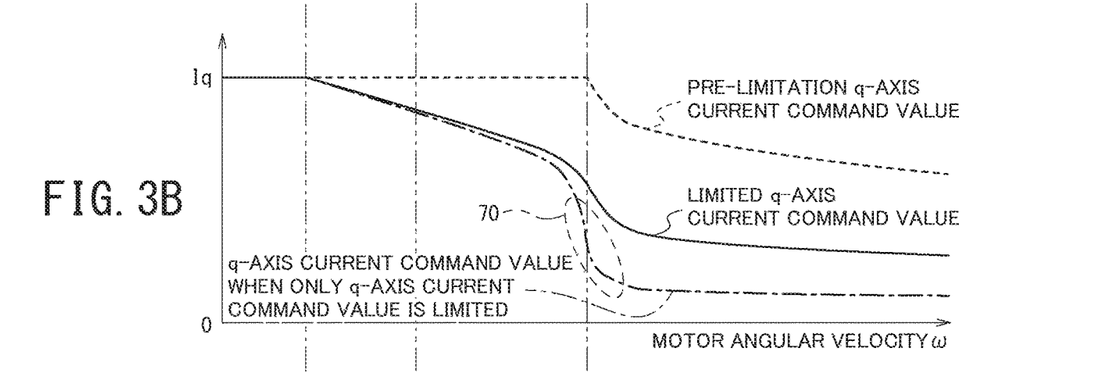
FIG. 3B is a graph broadly illustrative of relationships between a q-axis current command value Iq before limitation and the motor angular velocity $\omega$ and between a limited q-axis current command value Iq* and the motor angular velocity $\omega$.
Figure 3C:
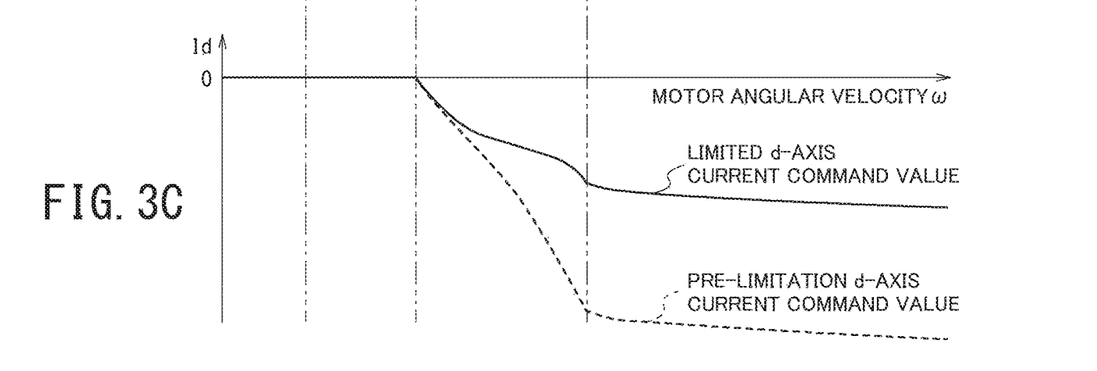
FIG. 3C is a graph broadly illustrative of relationships between a d-axis current command value Id before limitation and the motor angular velocity $\omega$ and between a limited d-axis current command value Id* and the motor angular velocity $\omega$, respectively.

With reference to FIGS. 3A, 3B, and 3C, an action of the motor control device of the embodiment will be described. FIG. 3A broadly illustrates a relationship between the limit gain. G and the motor angular velocity ω. FIG. 3B broadly illustrates relationships between the q-axis current command, value Iq before limitation and the motor angular velocity ω and between the limited q-axis current command value Iq* and the motor angular velocity ω. FIG. 3C broadly illustrates relationships between the d-axis current command value Id before limitation and the motor angular velocity ω and between the limited d-axis current command value Id* and the motor angular velocity ω.

The dashed line, the solid line, and the alternate long and short dash line in FIG. 3B illustrate the q-axis current command value Iq before limitation by the limit gain G, the limited q-axis current command value Iq*, and a q-axis current command value when only the q-axis current command value is limited as in PTL 1 described above, respectively.

The dashed line and the solid line in FIG. 3C illustrate the d-axis current command value Id before limitation by the limit gain G and the limited d-axis current command value Id*, respectively.

In a range of the motor angular velocity ω from 0 to a value ω1, the gain computation unit 51 outputs the limit gain G having a value of "1" because the power supply current is equal to or lower than the upper limit value $I_{batMAX}$. When the motor angular velocity ω exceeds the value ω1, the limit gain G becomes a value less than 1. For this reason, the q-axis current command value Iq is limited, and the magnitude (that is, absolute value) of the limited q-axis current command value Iq*, which is illustrated by the solid line, becomes smaller than the magnitude of the q-axis current command value Iq, which is illustrated by the dashed line.

When the motor angular velocity ω further exceeds a value ω2, the magnitude (that is, absolute value) of the d-axis current command value Id becomes greater than 0. Since the d-axis current command value Id is negative, this can be rephrased that the d-axis current command value Id becomes lower than 0. The d-axis current command value Id is also limited because the limit gain G has a value smaller than 1, and the magnitude of the limited d-axis current command value Id*, which is illustrated by the solid line, becomes smaller than the magnitude of the d-axis current command value Id, which is illustrated by the dashed line.

When the motor angular velocity ω further exceeds a value ω3, limitation of the q-axis current command value Iq by the current command value calculation unit 40 begins and the q-axis current command value Iq is limited to a value that does not cause duty saturation to occur. For this reason, reduction in the limit gain G is suspended.

In an area indicated by the reference sign 70, since only the q-axis current command value is limited as in PTL 1, only the q-axis current command value is excessively limited, causing motor output torque to be substantially reduced. This reduction in the motor output torque is liable to deteriorate motor performance and performance of an electrically driven actuator product using this motor.

On the other hand, use of the limit gain G that limits both the q-axis current command value and the d-axis current command value as in the present invention enables a larger amount of q-axis current to be left unreduced than in the case of correcting only the q-axis current command value. As a result, reduction in the motor output torque can be lightened.

Operation

Figure 4:
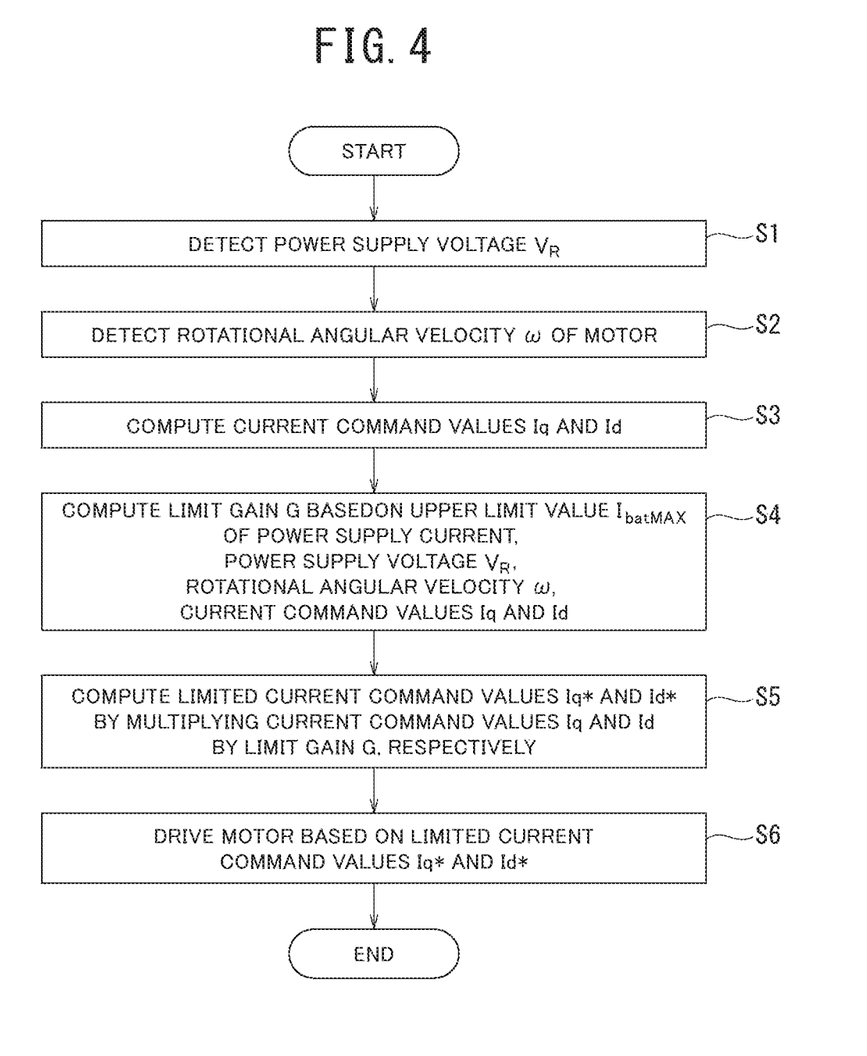
FIG. 4 is a flowchart of an example of a motor control method of the embodiment.

Next, with reference to FIG. 4, an example of the motor control method of the embodiment will be described.

In step S1, the voltage sensor 64 detects a power supply voltage $V_R$ that is applied to the inverter 48 by the battery 14.

In step S2, the resolver 63 and the angular velocity conversion unit 50 detect a rotational angular velocity ω of the motor 20.

In step S3, the current command value calculation unit 40 detects a q-axis current command value Iq and a d-axis current command value Id, based on steering torque Th and vehicle speed Vh.

In step S4, the gain computation unit 51 computes a limit gain G, based on an upper limit value $I_{batMAX}$ for the power supply current, the power supply voltage $V_R$, the rotational angular velocity ω of the motor 20, the q-axis current command value Iq, and the d-axis current command value Id and the correction gain computation equation (3).

In step S5, the multipliers 41 and 42 compute a limited q-axis current command value Iq* and a limited d-axis current command value Id* by multiplying the q-axis current command value Iq and the d-axis current command value Id by the limit gain G, respectively.

In step S6, the subtractors 43 and 44, the PI control unit 45, the two-phase/three-phase conversion unit 46, the PWM control unit 47, the inverter 48, and the three-phase/two-phase conversion unit 49 drive the motor 20, based on the limited q-axis current command value Iq* and the limited d-axis current command value Id*. Subsequently, the processing is terminated.

Advantageous Effects of First Embodiment (1) The motor control device that drives the motor 20 by means of vector control includes the the voltage sensor 64 configured to detect a power supply voltage $V_R$, the resolver 63 and the angular velocity conversion unit 50 configured to detect a rotational angular velocity ω of the motor 20, the current command value calculation unit 40 configured to calculate a q-axis current command value Iq and a d-axis current command value Id, the gain computation unit 51 configured to compute, based on an upper limit value $I_{batMAX}$ of power supply current supplied from the battery 14 to the motor 20, the power supply voltage $V_R$, the rotational angular velocity ω, the q-axis current command value Iq, and the d-axis current command value Id, a limit gain G that limits the q-axis current command value Iq and the d-axis current command value Id and thereby reduces the power supply current to the upper limit value $I_{batMAX}$ or lower, and the inverter 48 configured to drive the motor 20, based on a limited q-axis current command value Iq* and a limited d-axis current command value Id* that are obtained after being limited by the limit gain G.

Use of the limit gain G that limits both the q-axis current command value and the d-axis current command value as described above enables a larger amount of q-axis current to be left unreduced than in the case of correcting only the q-axis current command value. As a result, reduction in the motor output torque can be lightened.

(2) The gain computation unit 51 computes a limit gain G from a relationship that holds among input power based on the power supply voltage $V_R$ and the upper limit value $I_{batMAX}$, output power based on the rotational angular velocity ω and the q-axis current command value and the d-axis current command value that are limited by the limit gain G, and loss power.

This configuration enables a limit gain G that limits the q-axis current command value and the d-axis current command value in such a way as to reduce the power supply current to the upper limit value $I_{batMAX}$ or lower to be computed accurately.

Second Embodiment

Figure 5:
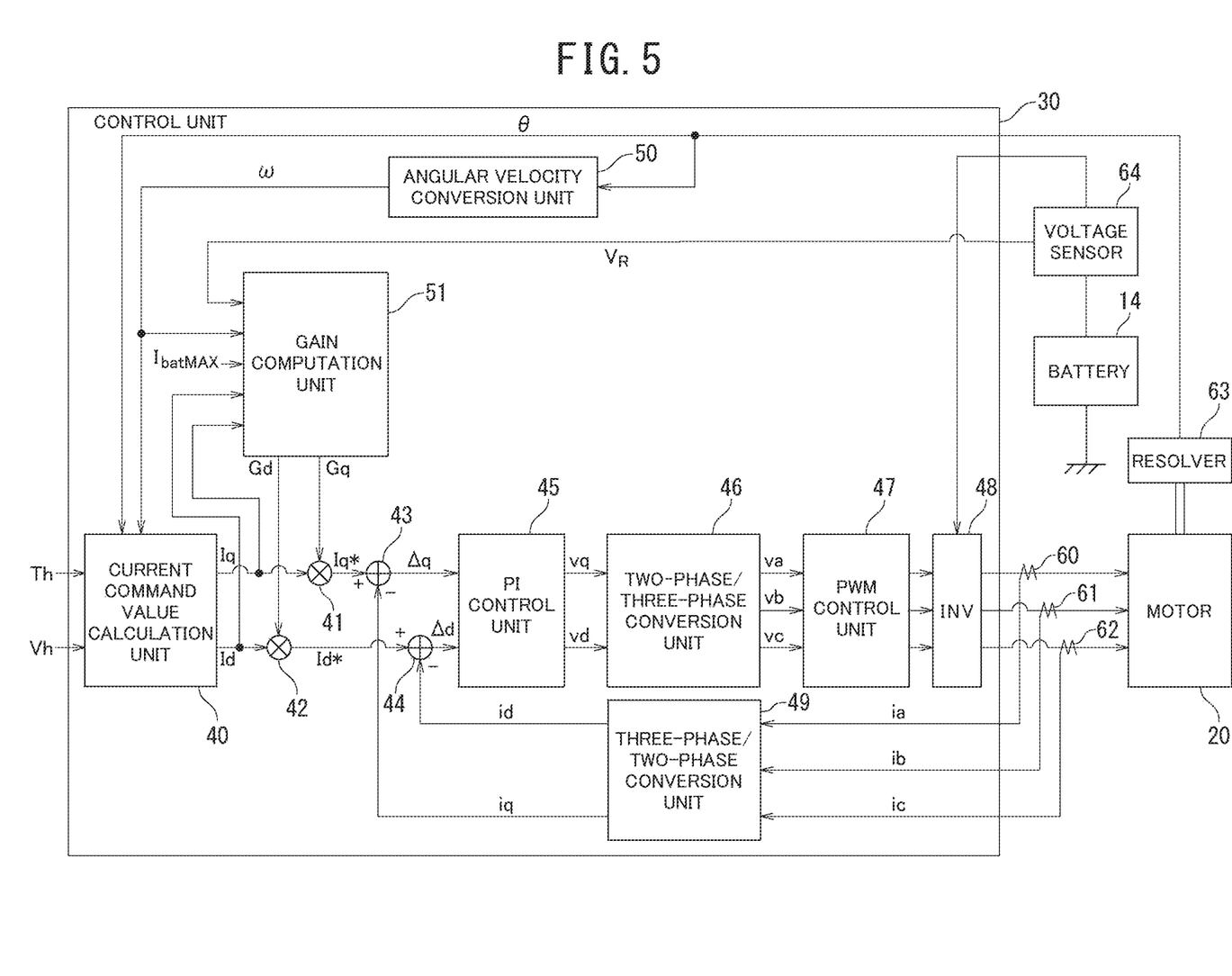
FIG. 5 is a block diagram illustrative of an example of a functional configuration of a control unit of a second embodiment.

Next, a second embodiment will be described. In FIG. 5, an example of a functional configuration of a control unit 30 of the second embodiment is illustrated.

A gain computation unit 51 of the control unit 30 of the second embodiment separately sets, as limit gains G, a q-axis limit gain Gq for limiting a q-axis current command value and a d-axis limit gain Gd for limiting a d-axis current command value. This configuration enables q-axis current and d-axis current to be prioritized over each other.

The other constituent components of the second embodiment are the same as the constituent components of the first embodiment, which was described with reference to FIG. 2.

The equation (2) above can be transformed into the equation (4) below by multiplying the q-axis current command value and the d-axis current command value by the q-axis limit gain Gq and the d-axis limit gain Gd, respectively.

[Math 4]

$$V_R \cdot I_{batMAX} = K_t \cdot Gq \cdot Iq \cdot \omega + R^{3/2} \cdot (Gd^2 Id^2 + Gq^2 Iq^2) + \text{Ploss} \quad (4)$$

Next, in order to prioritize the q-axis current and the d-axis current, a relationship between Gq and Gd is defined by the equation (5) below.

[Math 5]

$$\frac{1-Gd}{1-Gq} = p \quad (5)$$

In the equation above, p is a parameter that has an arbitrary value greater than 0. When the parameter p is 1, Gq and Gd coincide with each other and the priority of the q-axis current and the priority of the d-axis current coincide with each other.

When the parameter p is larger than 1, Gq becomes greater than Gd and the d-axis current command value Id is heavily limited (that is, the d-axis current command value Id is prioritized to be limited). In other words, the q-axis current is prioritized to be left unreduced.

On the contrary, when the parameter p is smaller than 1, Gd becomes greater than Gq and the q-axis current command value Iq is heavily limited (that is, the q-axis current command value Iq is prioritized to be limited). In other words, the d-axis current is prioritized to be left unreduced.

Solving the equations (4) and (5) above with respect to the q-axis limit gain Gq and the d-axis limit gain Gd results in correction gain computation equations (6) and (7) below.

[Math 6]

$$Gq = \frac{-\{K_t \cdot \omega \cdot Iq + 3R \cdot Id^2 \cdot p(1-p)\} + \sqrt{\begin{array}{c}(K_t \cdot \omega \cdot Iq + 3R \cdot Id^2 \cdot p(1-p))^2 + \\ 6R(Id^2 \cdot p^2 + Iq^2) \\ \left(V_R \cdot I_{batMAX} - \frac{3}{2}R \cdot Id^2 \cdot (1-p)^2 - P_{loss}\right)\end{array}}}{3R(Id^2 \cdot p^2 + Iq^2)} \quad (6)$$

[Math 7]

$$Gd = 1 - p(1 - Gq) \quad (7)$$

The gain computation unit 51 computes a q-axis limit gain Gq and a d-axis limit gain Gd, based on an upper limit value $I_{batMAX}$ for power supply current, power supply voltage $V_R$, rotational angular velocity ω of a motor 20, a q-axis current command value Iq, and a d-axis current command value Id and the correction gain computation equations (6) and (7). Multipliers 41 and 42 compute a limited q-axis current command value Iq* and a limited d-axis current command value Id* by multiplying the q-axis current command value Iq and the d-axis current command value Id by the q-axis limit gain Gq and the d-axis limit gain Gd, respectively.

In the processing above, the gain computation unit 51 may, by limiting the q-axis current command value Iq in priority to the d-axis current command value Id (that is, setting p as p<1), leave unreduced the d-axis current flowing to the motor 20 in a prioritized manner. This configuration enables a risk in occurrence or deterioration of duty saturation caused by limiting the d-axis current and occurrence or deterioration of noise caused thereby to be reduced.

On the contrary, the gain computation unit 51 may, by limiting the d-axis current command value Id in priority to the q-axis current command value Iq (that is, setting p as p>1), leave unreduced the q-axis current flowing to the motor 20 in a prioritized manner. This configuration enables the motor output reduction to be more lightened.

The value of the parameter p may be appropriately set according to output characteristics of the motor 20. For example, in a case of a motor in which achieving torque output is prioritized, a comparatively large parameter p may be used in order to lighten motor output reduction. For example, in a case of a motor in which achieving high rotational speed is prioritized, a comparatively small parameter p may be used in order to reduce occurrence and deterioration of duty saturation.

Advantageous Effects of Second Embodiment (1) The gain computation unit 51 separately computes a q-axis limit gain Gq for limiting the q-axis current command value Ig and a d-axis limit gain Gd for limiting the d-axis current command value Id. Calculating, separately the q-axis limit gain Gq and the d-axis limit gain Gd enables either of the q-axis current command value and the d-axis current command value to be limited in priority to the other. In other words, either of the q-axis current and the d-axis current can be prioritized to be left unreduced.

This configuration enables the limitation method of current command values to be changed according to performance and characteristics of the motor and characteristics and attributes of a device to which the motor is applied.

(2) The gain computation unit 51 may compute a q-axis limit gain Gq and a d-axis limit gain Gd in such a way as to limit the q-axis current command value Iq in priority to the d-axis current command value Id. This configuration enables the d-axis current flowing to the motor 20 to be left unreduced in a prioritized manner and a risk in occurrence or deterioration of duty saturation caused by limiting the d-axis current and occurrence or deterioration of noise caused thereby to be reduced.

(3) The gain computation unit may compute a q-axis limit gain Gq and a d-axis limit gain Gd in such a way as to limit the d-axis current command value Id in priority to the q-axis current command value Iq. This configuration enables the q-axis current flowing to the motor 20 to be left unreduced in a prioritized manner and the motor output reduction to be more lightened.

Although examples in which motor control devices of the embodiments of the present invention are applied to an electrically driven power steering device that provides steering assist force to the steering system of a vehicle, using a motor were described above, the present invention is not limited to the examples. The motor control devices of the embodiments of the present invention can be applied to various electrically driven actuator products that produce driving force, using a motor.

REFERENCE SIGNS LIST

1 Steering wheel
2 Column shaft
3 Reduction gear
4A Universal joint
4B Universal joint
5 Rack-and-pinion mechanism
6 Tie rod
10 Torque sensor
11 Ignition key
12 Vehicle speed sensor
14 Battery
20 Motor
30 Control unit
40 Current command value calculation unit
41, 42 Multiplier
43, 44 Subtractor 45 PI control unit
46 Two-phase/three-phase conversion unit
47 PWM control unit
48 Inverter
49 Three-phase/two-phase conversion unit
50 Angular velocity conversion unit
51 Gain computation unit
60, 61, 62 current sensor
63 Resolver
64 Voltage sensor

The invention claimed is:

1. A motor control device configured to drive a motor by means of vector control, the motor control device comprising:
a power supply voltage detection unit configured to detect a power supply voltage;
a rotational angular velocity detection unit configured to detect a rotational angular velocity of the motor;
a command value calculation unit configured to calculate a q-axis current command value and a d-axis current command value;
a gain computation unit configured to compute, based on an upper limit value of power supply current supplied from a power supply to the motor, the power supply voltage, the rotational angular velocity, the q-axis current command value, and the d-axis current command value, a limit gain reducing the power supply current to the upper limit value or lower by limiting the q-axis current command value and the d-axis current command value; and
a driving circuit configured to drive the motor, based on the q-axis current command value and the d-axis current command value limited by the limit gain, wherein
the limit gain separately includes a q-axis limit gain for limiting the q-axis current command value and a d-axis limit gain for limiting the d-axis current command value, and
the gain computation unit computes the q-axis limit gain and the d-axis limit gain, that are different from each other, in such a way as to limit either of the q-axis current command value and the d-axis current command value in priority to the other.

2. The motor control device according to claim 1, wherein the gain computation unit computes the limit gain, based on a relationship holding among input power based on the power supply voltage and the upper limit value, output power based on the rotational angular velocity and the q-axis current command value and the d-axis current command value limited by the limit gain, and loss power.

3. The motor control device according to claim 1, wherein the gain computation unit computes the q-axis limit gain and the d-axis limit gain in such a way as to limit the q-axis current command value in priority to the d-axis current command value.

4. The motor control device according to claim 1, wherein the gain computation unit computes the q-axis limit gain and the d-axis limit gain in such a way as to limit the d-axis current command value in priority to the q-axis current command value.

5. An electrically driven actuator product comprising:
a motor control device according to claim 1; and
a motor configured to be controlled by the motor control device.

6. An electrically driven power steering device comprising:
a motor control device according to claim 1; and
a motor configured to be controlled by the motor control device,
the electrically driven power steering device providing a steering system of a vehicle with steering assist force, using the motor.

7. The motor control device according to claim 1, wherein the q-axis limit gain and the d-axis limit gain relate to each other according to the equation $(1-Gd)/(1-Gq)=p$, where Gq and Gg denote the q-axis limit gain and the d-axis limit gain, respectively, and p is a parameter set according to output characteristics of the motor to be greater than or less than 1.

* * * * *